No. 887,905. PATENTED MAY 19, 1908.
L. F. ADT.
GUARD FOR EYEGLASSES.
APPLICATION FILED MAY 10, 1907.

Witnesses
Walter B. Payne.
H. H. Simmons

Inventor
L. F. Adt
By Church & Rich
his Attorneys

UNITED STATES PATENT OFFICE.

LEO F. ADT, OF ALBANY, NEW YORK.

GUARD FOR EYEGLASSES.

No. 887,905.

Specification of Letters Patent.

Patented May 19, 1908.

Application filed May 10, 1907. Serial No. 372,845.

*To all whom it may concern:*

Be it known that I, LEO F. ADT, of Albany, in the county of Albany and State of New York, have invented certain new and useful Improvements in Guards for Eyeglasses; and I do hereby declare the following to be a full, clear, and exact description of the same, reference being had to the accompanying drawings, forming a part of the specification, and to the reference-numerals marked thereon.

This invention relates to nose guards for eyeglasses and particularly to bearing pads for the guards, an object being to clamp the nose in such a manner that, while the glasses will be firmly held against forward tilting, no soreness of the nose will be caused by cutting or bruising.

To this and other ends the invention consists in certain improvements and combinations of parts all as will be hereinafter more fully described, the novel features being pointed out in the claims at the end of the specification.

Figure 1:
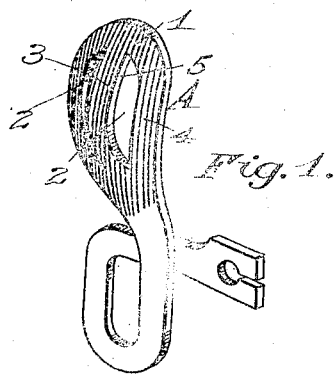
Figure 2:
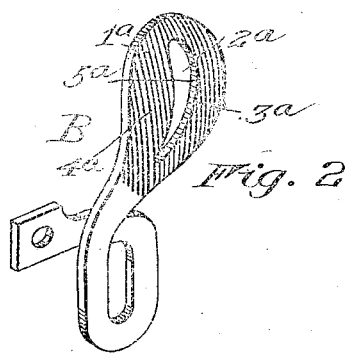
Figure 1A:
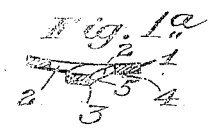
Figure 3:
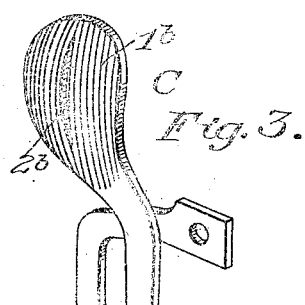
Figure 2A:
Figure 4:
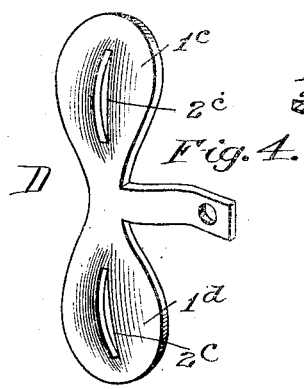
Figure 3A:
Figure 5:
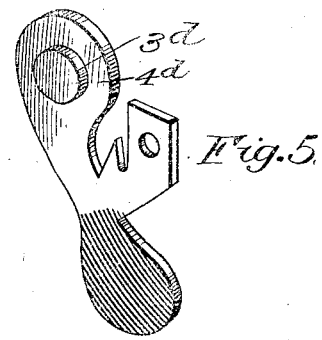

In the drawings: Figures 1 and $1^a$ show respectively a perspective view of a nose guard embodying my invention, and a transverse section through the bearing pad thereof. Figs. 2 and $2^a$ are like views of another embodiment. Figs. 3 and $3^a$ are like views of still another embodiment. Fig. 4 is a perspective view of a guard having two pads embodying the form of my invention illustrated in Figs. 3 and $3^a$. Fig. 5 is a perspective view of a further embodiment of my invention.

Similar reference numerals in the several figures indicate similar parts.

As these guards extend in rear of the lenses when mounted, it is important not only that they serve to prevent the glasses from moving on the nose, but also prevent forward tilting, which is usually resisted only by the grip which the anchoring or upper bearing portions exert, and with the object in view of preventing this forward tilting and at the same time preventing the edge of the metal, or other material, from cutting into the nose, I provide the guards with a relatively small anchoring projection and a land or bearing part in front thereof, that is, toward the lenses.

With more particular reference to the drawings and to the embodiment shown in Figs. 1 and $1^a$, A indicates a nose guard of any suitable form having an upper bearing pad 1 cut away or formed with spaced elongated openings 2 to provide a flesh-engaging projection which extends beyond and from the bearing face of the pad and is provided with a substantially vertical edge 3, a bearing surface or land 4 being positioned forward of the edge 3 as the guards are in position in rear of the lenses. The edge 3 serves to enter the flesh of the nose, but has its inward movement limited by the land 4 in the front of the edge and also by the bearing face in rear of the edge. It will be noted that the edge is formed by two faces at an angle to each other, one face 5 being preferably substantially perpendicular to the face on the face in rear of the edge of the pad and the other face being substantially parallel thereto.

In the embodiment shown in Figs. 2 and $2^a$ the bearing pad $1^a$ of a suitable nose guard B is provided with an elongated slot $2^a$ and the rear and curved wall of the slot is pressed outwardly beyond the face $4^a$ of the pad to provide an edge $3^a$. The face in rear of the edge is preferably substantially parallel to the bearing face of the pad while the face $5^a$ is preferably substantially perpendicular thereto.

In the embodiment shown in Figs. 3 and $3^a$ the pad $1^b$ of a suitable nose guard C is provided with a vertical slit $2^b$, and the wall in rear of the slit is pressed outwardly in the same manner as in Figs. 2 and $2^a$ to provide substantially the same kind of gripping edge.

The nose guard D shown in Fig. 4 has an upper bearing pad $1^c$ and a lower bearing pad $1^d$, both of which are provided with slots $2^c$ and bent in the manner shown in Figs. 2 and 3, to form gripping edges.

In Fig. 5 the nose guard has only its upper bearing pad provided with my improved flesh-engaging projection, the edge in this embodiment being formed by the front face $3^d$ of a cylindrical stud provided in any suitable manner on the bearing face of a pad, the face of the stud in this instance being parallel to the bearing face $4^d$ of the pad and the bearing face serving as the land in front of the edge. It will be noted that in this embodiment the stud is entirely surrounded by the bearing face of the pad. This projection may be formed of sheet metal by pressing out the metal in rear of the forward edge of the guard.

The terms "substantially perpendicular to the bearing face of the pad" are intended to cover either a perpendicular wall or a wall at a slight angle to the perpendicular, provided the wall will accomplish the results of this invention.

I claim as my invention:

1. A nose guard having a bearing pad provided with an outwardly projecting holding portion, having a rigid edge on the bearing face thereof, and a bearing face in front of the edge.

2. A nose guard having a bearing pad provided on its bearing face in rear of the forward portion of the latter with a rigid edge formed by two walls, one of which is substantially perpendicular to the bearing face and the other of which is substantially parallel to said face.

3. A nose guard formed of sheet metal having a projecting portion formed with a gripping edge and drawn above the surface bearing thereof, and in rear of the forward edge of the guard.

4. A nose guard pad having a metallic projection formed with a gripping edge and entirely surrounded by the bearing face of the pad, the gripping edge being located in a plane to one side of the plane of the bearing face.

LEO F. ADT.

Witnesses:
MICHAEL F. O'CONNOR,
LUCY B. CLEXTON.